United States Patent [19]

Altmann

[11] Patent Number: 4,603,708

[45] Date of Patent: Aug. 5, 1986

[54] SHUT-OFF VALVE

[76] Inventor: Hans-Peter Altmann, Wülfrath, Fed. Rep. of Germany

[21] Appl. No.: 649,943

[22] Filed: Sep. 13, 1984

[30] Foreign Application Priority Data

Sep. 22, 1983 [DE] Fed. Rep. of Germany ....... 3334189

[51] Int. Cl.[4] ............................................. G05D 16/00

[52] U.S. Cl. ...................................... 137/116; 137/488

[58] Field of Search ................ 137/116, 115, 4, 489.5, 137/489, 488

[56] References Cited

U.S. PATENT DOCUMENTS

| | | | |
|---|---|---|---|
| 3,024,732 | 3/1962 | Nyman | 137/116 X |
| 3,788,339 | 1/1974 | Denker | 137/116 X |
| 4,114,037 | 9/1978 | Johnson | 137/116 |

*Primary Examiner*—Alan Cohan

*Attorney, Agent, or Firm*—Reising, Ethington, Barnard, Perry & Milton

[57] ABSTRACT

The invention relates to a shut-off valve equipped with two pilot-valves and a main control-piston, the said valve connecting in inlet with an outlet when an upper switching pressure is reached and breaking this connection again when the pressure drops to a lower switching pressure. In order to reduce leakage and to improve the switching process, the pilot-valve (12), which determines the lower switching pressure, is in the form of a seat-valve held open by spring-force, the said pilot-valve closing off a control-line when the lower switching pressure is exceeded, and a second flow-path (21) being provided which is interrupted both by the main control-piston (3), in the shut-off phase, and by the pilot-valve (13) which determines the upper switching pressure, at least when, and shortly after, the shut-off (see drawing).

8 Claims, 1 Drawing Figure

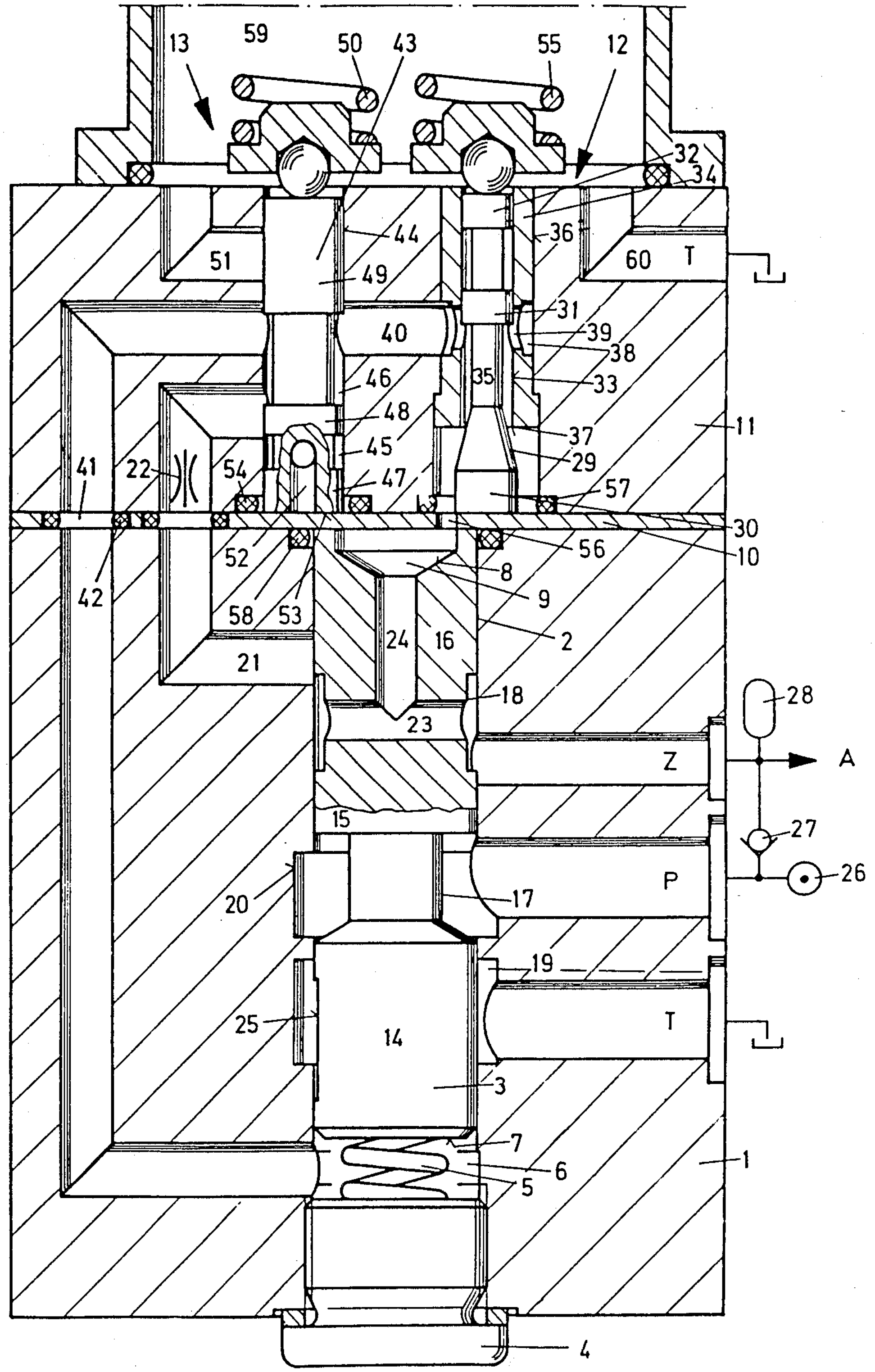
13
59
50
43
55
12
32
34
44
36
51
49
60
T
31
40
39
38
46
33
35
48
37
11
45
29
41
22
54
47
57
30
52
56
10
42
8
58
53
9
24
16
2
21
18
28
23
Z
A
15
27
20
17
P
26
19
25
T
14
3
7
6
1
5
4

SHUT-OFF VALVE

TECHNICAL FIELD

The subject invention relates to a shut-off valve for use in a hydraulic system.

BACKGROUND ART

It is known that shut-off valves are used to switch the flow from a source of pressure into pressureless circulation, as long as a predetermined pressure-level is maintained in a hydraulic system. In order to extend the time between two switching points, hydraulic accumulators are usually incorporated into the hydraulic system. The hydraulic system and the accumulators are fed jointly from the source of pressure through a check-valve which prevents a return-flow of the pressure medium from the hydraulic system when the shut-off valve is switched to circulate. The pressure for controlling the pilot-valves is taken off in each case downstream of the said check-valve and thus corresponds at all times to the pressure in the hydraulic system.

Known shut-off valves of this type always function satisfactorily when the pressure-gradient, during charging of the hydraulic circuit, is steep or, in other words, when the time taken to reach the upper switching point is short. In the case of very small pressure-gradient, such as arise, for example, when the supply-flow is only slightly greater than the consumption, or when very large accumulator must be filled with small pumps, it frequently happens that the main control-piston switches-through and remains in an intermediate position producing a back-pressure. Another disadvantage occurs when a hydraulic system is to remain under pressure for a long period of time. Since the pilot-valves are subjected to the pressure of the hydraulic system, a certain amount of leakage is unavoidable and this leads to an immediate drop in pressure and unnecessary functioning of the shut-off valve. This behaviour is also unsatisfactory from the point of view of energy balance. As far as the general switching behavior of these shut-off valves is concerned, other disadvantages arise at times, in that the set switching pressures vary as a function of other operating parameters, presumably as a result of dynamic processes in the valves.

STATEMENT OF THE INVENTION AND ADVANTAGES

It is the purpose of the invention to design shut-off valves of the type in question in such a manner as to improve switching as a whole, especially in the case of small pressure gradients, and to reduce leakage. In this connection, switching is to be understood to mean not only switching-through as quickly and uniformly as possible, but also obtaining the best possible constancy of switching pressures. The configuration of the valve is to be simple and inexpensive and within hitherto conventional dimensions.

The subject invention relates to a shut-off valve for use in a hydraulic system having a pump and an accumulator or similar device. The shut-off valve connects an inlet feeding a hydraulic system to an outlet when an upper switching pressure is reached, and disconnects the inlet and outlet when a lower switching pressure is reached in the hydraulic system.

The valve body houses a main-control piston having first and second effective areas thereon, and which is urged toward the first switching position by a restoring spring. The first effective area defines a first control chamber and is acted upon by a control pressure, the valve of which is determined by first and second pilot valves. The second effective area defines a second control chamber and is permanently subject to the pressure of the hydraulic system. Further, the second effective area serves to counteract the first effective area which is loaded in the same direction as the restoring spring.

The first pilot-valve is a seat valve which is loaded by a control spring. When system pressure is below the lower switching pressure, the first pilot valve is held open by the control spring. Whereas, when the lower switching pressure is exceeded, the seat surface of the first pilot valve causes it to close tightly in response to system pressure.

A second flow-path exists between the hydraulic system and the first control chamber. This flow path is opened by the main-control piston in its first switching position and closed thereby in its second switching position. The second flow path also passes through the second pilot valve and serves as the control pressure therefor.

The advantage of this arrangement is that, in the switched-off condition, there is no longer any pressure-leakage from the hydraulic system in the pilot area. The seat-valve, for the lower switching pressure, although it is under permanent load, closes hermetically until this lower switching pressure again falls short. The pilot-valve for the upper switching pressure is under pressure only during the charging phase, since the connection between the pressure-chamber thereof and the hydraulic system is otherwise interrupted.

BRIEF DESCRIPTION OF THE DRAWINGS

Other advantages of the present invention will be readily appreciated as the same becomes better understood by reference to the following detailed description when considered in connection with the accompanying drawing wherein:

The FIGURE is a schematic cross-sectional view showing the shut-off valve is detail.

DESCRIPTION OF THE PREFERRED EMBODIMENT

Arranged in a valve-body 1 is a bore 2 in which a main control-piston 3 is arranged to slide. Bore 2 is sealed off from the outside by means of a plug 4 which supports a restoring spring 5 which acts upon the said main control-piston 3. The chamber within bore 2, traversed by the said restoring spring, is known as a first control-chamber 6 and is bounded by the end-face of the main control-piston acting as a first effective area 7. The opposing end-face of the said main control-piston 3 acts as the second effective area 8 which defines a second control chamber 9.

A control-block 11 is flanged to valve-body 1 with an intermediate plate 10 therebetween. Arranged in control-block 11, in parallel with main control-piston 3, is a first pilot-valve 12 and a second pilot-valve 13. As seen from restoring spring 5, the said main control piston 3 comprises shoulders 14, 15, 16 separated from each other by annular grooves 17, 18. In the first switching position of the main control-piston 3 as shown in the drawing, bore 2 is surrounded by a longitudinal annular groove 19, closed off by shoulder 14, into which an outlet T opens. Arranged in the vicinity of annular groove 17, in valve-body 1 is a longitudinal annular groove 20 which is connected to inlet P. A control-line z opens into bore 2 in the vicinity of annular groove 18. A passage referred to as second flow-path 21 opens into bore 2 in the area of annular groove 18, although displaced towards second control-chamber 9, the said passage containing a restriction 22. A transverse passage 23 runs from annular groove 18 and, from this passage, a longitudinal passage 24 branches off into the second control-chamber 9. Located on shoulder 14 is a restricted connection in the form of a flat 25 which serves as a restriction but is somewhat shorter than the said shoulder, so that longitudinal annular grooves 19, 20, on the one hand, and annular groove 18 and control-chamber 6, on the other hand, are separated from each other in the first switching position.

Inlet P is fed from a pressure source 26. A hydraulic accumulator 28, and a hydraulic system A, not shown in detail, are connected through a check-valve 27, with a control line z branching off. The first pilot-valve 12 comprises a piston 30 equipped with a seat-surface 29 and two guide-shoulders 31, 32 said piston 30 is slideably disposed sliding in a bush 34 which is inserted into control-block 11, a web 35 between seat-surface 29 and shoulder 31 being of smaller diameter than inner bore 33. Bush 34 is seated firmly in a stepped bore 36 in control-block 11. The mouth of inner bore 33 serves as a valve-seat 37 for seat-surface 29. In the vicinity of web 35, bush 34 is provided with an annular groove 38 which is connected, through a transverse passage 39 to inner bore 33. A duct 40, acting as a flow-path to first control-chamber 6, is located opposite annular groove 38 in control-block 11. Duct 40 corresponds to a through-hole 41 in intermediate plate 10 which is surrounded by sealing ring 42. The second pilot-valve 13 comprises a control-piston 43 arranged to slide in a piston-bore 44 which intersects duct 40. Control-piston 43 comprises shoulders 47, 48, 49 separated by annular grooves 45, 46. A control-spring 50 urges control-piston 43 towards a first switching position in which second flow-path 21 communicates with annular grooves 45, 46, while an outlet-duct 51 is closed by shoulder 49.

Duct 40 intersects piston-bore 44 in the vicinity of annular groove 46. From annular groove 45 there runs a control-passage 52 which opens into end-face 53 which serves as an effective area subjected to pressure and counteracts control-spring 50. Control-piston 43 comes to a stop against intermediate plate 10 which is unperforated in this area. Piston-bore 44 is counterbored at this point and is sealed by means of a sealing ring 54. Piston 30 of first pilot-valve 12 is also loaded by a control-spring 55 and comes to a stop at intermediate plate 10 which, in this area, comprises a through-hole 56 which connects second control-chamber 9 to bore 36 which is sealed off from intermediate plate 10 by a sealing ring 57. A corresponding sealing ring 58 is seated in a counter-bore surrounding bore 2, which is thus sealed. Outlet-duct 51 opens into spring-chamber 59 which contains control-springs 50 and 55 and is connected to outlet T through a further outlet-duct 60.

The operation of the valve will be explained hereinafter, starting from the switching position illustrated in the drawing and assuming that the valve is depressurized. As soon as pressure-source 26 begins to deliver the pressure-medium, this flows simultaneously, through check-valve 27 into hydraulic accumulator 28 and hydraulic system A and, through control-line z, into annular groove 18, second flow-path 21 with restriction 22, annular groove 46, duct 40 with through-hole 41, and into first control-chamber 6. Branching from annular groove 18, the pressure-medium also passes through transverse passage 23, and longitudinal passage 24, into second control-chamber 9 and thence through through-hole 56, stepped bore 36, valve-seat 37, inner bore 33, transverse passage 39 and annular groove 38, into duct 40. Finally, the said pressure-medium also acts, through control-passage 52, upon end-face 53 of control-piston 43. It is obvious that main control-piston 3 is pressure-equalized so that restoring spring 5 predominates and the first switching position is retained in which inlet P is separated from outlet T. When the filling of hydraulic accumulator 28 then produces the lower switching pressure, piston 30 is moved by the pressure acting upon it, against the force of control-spring 55, until seat-surface 29 is seated upon valve-seat 37, thus sealing off this flow-path. However, since pressure-medium can still flow through second flow-path 21, main control-piston 3 still remains pressure-equalized. As the pressure increases, the pressure of end-face 53 eventually overcomes the preload of control-spring 50, causing control-piston 43 to move. Shoulder 48 will then close off second flow-path 21 before annular groove 46 reaches the vicinity of outlet-duct 51 and thus establishes a connection between duct 40 and outlet-duct 51. This relieves the pressure in first control-chamber 6, so that pressure in second control-chamber 9 now predominates. This causes main control-piston 3 to move towards its second switching position. Annular groove 18 is moved out of second flow-path 21. Shortly thereafter annular groove 17 comes into communication with longitudinal annular groove 19 and inlet p is connected to outlet T. As a rule, main control-piston 3 moves through to its terminal position which is always possible if control-piston 43 is open to outlet-duct 51. If this is ever not the case, the pressure-medium can escape from first control-chamber 6, through restricted connection 25, into longitudinal annular groove 19. This provides reliable switching through at all times, although it may be rather slow. A possible small amount of leakage between annular groove 18 and second flow-path 21, and the pressure-medium expelled when control-piston 43 is returned, can also flow way through restricted connection 25. A return-flow of pressure-medium from hydraulic accumulator 28, or from hydraulic circuit A, is prevented by check-valve 27. Consumption of pressure-medium in hydraulic system A is replaced from hydraulic accumulator 28, at which time there is naturally a drop in pressure. This drop in pressure also reaches control-line z which, however, is still separated from second flow-path 21. It may therefore be assumed that control-piston 43 has returned to its original position, but that end-surface 53 thereof is not subjected to pressure. However, control-pressure acts permanently upon piston 30, thus keeping pilot-valve 12 closed at any pressure above the lower switching pressure. Only when the pressure has fallen below the lower switching pressure does control-spring 55 again predominate, and seat-surface 29 lifts from valve-seat 37. The pressure-medium now flows along the first flow-path, already described, into duct 40 and thus into control-chamber 6. Main control-piston 3 is again pressure-equalized and is returned, by restoring spring 5, to its original switching position. Shoulder 14 again closes the connection between P and T and annular groove 18 again reaches the vicinity of second flow-path 21. As the pressure increases, although first pilot-valve 12 closes immediately, main control-piston 3 remains pressure-equalized through second pilot-valve 13 until the upper switching pressure is reached. The cycle can then be repeated as often as desired. The preloads on control-springs 50 and 55 may generally be adjustable, thus allowing the switching pressure to be adjusted independently.

It is quite clear that one of the normally main sources of leakage, namely the first pilot-valve, which is permanently subjected to system-pressure, is now hermetically sealed. Since the second pilot-valve is depressurized in the shut-off phase, there can also be no leakage there. The switching process is also improved, since the double break in the supply of control-pressure prevents any hang-up or countermovement of the main control-piston. Restriction 22 also contributes to reliable switching, since this passes only a limited amount of control-flow and prevents over-control of second pilot-valve 13. Finally flat 25 also provides reliable switching-through.

The invention is not restricted to the example of embodiment illustrated. The internal layout of the passages, shown here in only one plane for the sake of clarity, may also vary within wide limits. The configuration of the pistons is left to the discretion of the designer and annular grooves may at times be replaced by passage or, conversely, passages may be replaced by annular grooves. Finally, it is also possible to integrate check-valve 27 into valve-body 1. The design of the restrictions may also be based upon a number of known designs.

What is claimed is:

1. A shut-off valve for connecting an inlet feeding a hydraulic system to an outlet when an upper switching pressure is reached in the hydraulic system and for breaking this connection when a lower switching pressure is reached in the hydraulic system, comprising (a) a main control-piston (3) which, in a first switching position, breaks the connection between the inlet (P) and the outlet (T) and, in a second switching position, makes the said connection;

(b) a restoring spring (5) urging the main control-piston (3) towards the first switching position;

(c) a first effective area (7), on the main control-piston (3) in a first control-chamber (6), which is acted upon by a control-pressure, the value thereof being controlled by a first pilot valve (12) and a second pilot valve (13) and which loads the said first effective area (7) in the same direction as the restoring spring (5);

(d) a second effective area (8) on the main control-piston (3) in a second control-chamber (9), which counteracts the said first effective area (8), is of the same size, and is subjected permanently to the pressure of the hydraulic system (A);

(e) a first pilot-valve (12) which, when the pressure falls short of the lower switching pressure, opens a connection between the hydraulic system (A) and the first control-chamber (6);

(f) a second pilot-valve (13) which, when the upper switching pressure is exceeded, opens a connection between the first control-chamber (6) and the outlet (T), characterized in that (g) the first pilot-valve (12) is a seat-valve loaded by a control-spring (55), said first pilot-valve (12) being held open by said control-spring (55) when pressure is below the lower switching pressure and whose seat-surface (29) is exposed permanently to the pressure of the hydraulic system (A) and which, when the lower switching pressure is exceeded, causes the said seat-valve to close tightly;

(h) a second flow-path (21) exists between the hydraulic system (A) and the first control-chamber (6), said second flow path (21) being opened by the main control piston (3) in its first switching position and being closed thereby in the second switching position thereof, said second (21) flow-path also passing through the second pilot-valve (13) and being closed thereby when the upper switching pressure is reached;

(j) the pressure in the second flow-path (21) between the main control-piston (3) and the second pilot-valve (13) serves as the control-pressure for the second pilot-valve (13).

2. A shut-off valve according to claim 1, further characterized in that the main control-piston (3) opens, in its second switching position, a restricted connection (25) between the first control-chamber (6) and the outlet (T).

3. A shut-off valve according to claim 2, further characterized in that the restricted connection (25) is in the form of a flat of lesser depth on the casing of the main control-piston (3), said flat connecting, in the second switching position, duct (40) and longitudinal annular groove (19) associated with the first control-chamber (6) and the outlet (T).

4. A shut-off valve according to claim 3, characterized in that the second flow-path (21) comprises a restriction (22) located between the main control-piston (3) and the second pilot-valve (13).

5. A shut-off valve according to claim 1 or 4, further characterized in that the second pilot-valve (13) has a 3/2-way characteristic, so that, in the switching position effected by the control-spring (50), the second flow-path (21) is connected to the first control-chamber (6) and, in the second switching position, achievable against the action of the said control-spring, the first control-chamber (6) is connected to the outlet (T) and outlet duct (51).

6. A shut-off valve according to claim 5, further characterized in that the main control-piston (3) comprises an annular groove (18) which, in the first switching position, connects the hydraulic system (A) to the second flow-path (21), which remains permanently connected to the hydraulic system (A), and is connected, through a transverse passage (23) and a longitudinal passage (24), to the second control-chamber (9).

7. A shut-off valve according to claim 6, further characterized in that the main control-piston (3) is accommodated, in a manner known per se, in a valve-body (1) to which is flanged a control-block (11) accommodating a first pilot-valve (12) and a second pilot-valve (13), an intermediate plate (10) being arranged between the said valve-body (1) and a control-block (11), said intermediate plate (10) providing, on the one hand, a leakproof connection between corresponding passages in the said valve-body and comprising, to this end, sealing rings (42) surrounding through-hole (41); and, on the other hand, providing passages (44,2,36) in the valve-body (1) and the control-block (11) carrying pressure to the seal, the ends of the pressure-carrying passages (44,2,36) comprising counter-bores for the accommodation of sealing rings (54,58,57).

8. A shut-off valve according to claim 7, further characterized in that the second control-chamber (9) is separated from the piston-bore (44) of the second pilot-valve (13) by an unperforated area of the intermediate plate (10), whereas the flow-path to the first pilot-valve (12) passes through the second control-chamber (9) and an opening (56) in the said intermediate plate.

* * * * *